United States Patent
Gering et al.

(10) Patent No.: US 7,929,793 B2
(45) Date of Patent: Apr. 19, 2011

(54) REGISTRATION AND COMPRESSION OF DYNAMIC IMAGES

(75) Inventors: David Thomas Gering, Waukesha, WI (US); Gopal Biligeri Avinash, Menomonee Falls, WI (US)

(73) Assignee: General Electric Company, Schenectady, NY (US)

( * ) Notice: Subject to any disclaimer, the term of this patent is extended or adjusted under 35 U.S.C. 154(b) by 1065 days.

(21) Appl. No.: 11/725,406

(22) Filed: Mar. 19, 2007

(65) Prior Publication Data
US 2008/0231910 A1 Sep. 25, 2008

(51) Int. Cl.
*G06K 9/36* (2006.01)

(52) U.S. Cl. .................................. 382/239

(58) Field of Classification Search .......... 382/128–134, 382/232, 240, 305; 709/247; 707/915; 710/65
See application file for complete search history.

(56) References Cited

U.S. PATENT DOCUMENTS

| | | | |
|---|---|---|---|
| 5,333,212 A | 7/1994 | Ligtenberg | |
| 5,563,960 A | 10/1996 | Shapiro | |
| 6,633,674 B1 | 10/2003 | Barnes et al. | |
| 6,775,412 B1 | 8/2004 | Nister et al. | |
| 6,891,973 B1 | 5/2005 | Atsumi et al. | |
| 6,912,319 B1 | 6/2005 | Barnes et al. | |
| 7,027,655 B2 | 4/2006 | Keeney et al. | |
| 7,068,848 B2 | 6/2006 | Park et al. | |
| 7,139,417 B2 | 11/2006 | Nicolas et al. | |
| 7,257,266 B2 | 8/2007 | Atsumi et al. | |
| 7,526,132 B2 * | 4/2009 | Koenig | 382/232 |

OTHER PUBLICATIONS

Krishnan, Karthik; "Efficient Transmission of Compressed Data for Remote Volume Visualization"; IEEE Transactions on Medical Imaging, vol. 25, No. 9, pp. 1189-1199; Sep. 2006.
Van Assche et al., "Exploiting Interframe Redundancies in the Lossless Compression of 3D Medical Images", ISBN: 90-73461-18-9, STW, 1999, pp. 521-527 http://citeseer.ist.psu.edu/266601.html.
Salih Burak Gokturk et al., "Medical Image Compression Based on Region of Interest, with Application to Colon CT Images" http://www.stanford.edu/~bgirod/pdfs/GokturkMedical2001.pdf.
Pingkun Yan et al., "Lossless and Near-Lossless Motion-Compensated 4D Medical Image Compression", 2004 http://www.cs.ucf.edu/~pingkun/pdf/Yan04_BioCAS.pdf.
Matthew J, Zukoski et al., "A Novel Approach to Medical Image Compression", Int. J. Bioinformatics Research and Applications, vol. 2, No. 1, 2006.

(Continued)

*Primary Examiner* — Jose L Couso
(74) *Attorney, Agent, or Firm* — Fletcher Yoder, PC

(57) ABSTRACT

A technique for selecting portions of a dynamic medical image data set to be stored and portions of the medical image data set to be discarded or processed differently in order to reduce the overall amount of image data that is stored for each image data set. The dynamic image data is segmented and registered. The segmentation and registration enables changes in intensity based on patient motion to be distinguished from changes in intensity due to anatomical function. In general, the regions with changes in intensity due to anatomical function are more relevant than regions with changes in intensity due to patient motion. The regions of greatest relevance are stored at their full resolution. Regions of lesser relevance are stored at less than the full resolution. Regions of no relevance are discarded and not stored at all.

32 Claims, 11 Drawing Sheets

OTHER PUBLICATIONS

Patrick Piscaglia et al., "Lossy Multiresolution Compression and Segmentation of 3D MR Images of the Head" http://citeseer.ist.psu.edu/piscaglia96lossy.html.

Patrick Piscaglia et al., "ROI-Based Multiresolution Compression of Heart MR Images", http://citeseer.ist.psu.edu/62088.html.

E. Atsumi et al., "Lossy/Lossless Region-of-Interest Image Coding Based on Setpartitioning in Hierarchical Trees", Image Processing, 1998 International Conference, vol. 1, Issue 4-7, Oct. 1998, pp. 87-91. Only Abstract available http://ieeexplore.ieee.org/Xplore/login.jsp?url=/iel4/5852/15617/00723428.pdf?arnumber=723428.

A. Bruckmann et al., "Selective Medical Image Compression Techniques for Telemedical and Archiving Applications", Computers in Biology and Medicine, vol. 30, Issue 3, May 2000, pp. 153-169. Only Abstract available http://www.ncbi.nlm.nih.gov/sites/entrez?cmd=Retrieve&db=PubMed&list_uids=10758230&dopt=Citation.

Jose Ramon Varela et al., "A Compression and Transmission Scheme of Computer Tomography Images for Telemedicine Based on JPEG2000". Only Abstract available http://www.liebertonline.com/doi/abs/10.1089/tmj.2004.10.S-40?cookieSet=1&journalCode=tmj.2.

D. Gibson et al., "A Wavelet-Based Region of Interest Encoder for the Compression of Angiogram Video Sequences", Information Technology in Biomedicine, IEEE Transactions, vol. 8, Issue 2, Jun. 2004, pp. 103-113. Only Abstract available http://ieeexplore.ieee.org/Xplore/login.jsp?url=/iel5/4233/28955/01303553.pdf.

A. Cuhadar et al., "Region of Interest Image Coding for Digital Mammography", Engineering in Medicine and Biology Society, 27th Annual International Conference, 2005, pp. 3785-3788. Only Abstract available http://ieeexplore.ieee.org/Xplore/login.jsp?url=/iel5/10755/33900/0167308.pdf.

Dong Kyoo Shin et al., "A Region of Interest Wavelet Compression Scheme for Medical Images", 2007. Only Abstract available http://cat.inist.fr/?aModele=afficheN&cpsidt=2733365.

* cited by examiner

REGISTRATION AND COMPRESSION OF DYNAMIC IMAGES

BACKGROUND

The invention relates generally to the field of medical image data storage. More particularly, the invention relates to a technique for reducing the amount of medical image data of a dynamic medical image data set that is stored in long-term data storage.

Picture archiving and communications systems, or PACS, have become an extremely important component in the management of digitized image data, particularly in the field of medical imaging. Such systems often function as central repositories of image data, receiving the data from various sources, such as medical imaging systems. The image data is stored and made available to radiologists, diagnosing and referring physicians, and other specialists via network links. Improvements in PACS have led to dramatic advances in the volumes of image data available, and have facilitated loading and transferring of voluminous data files both within institutions and between the central storage location and remote clients.

In the medical diagnostics field, depending upon the imaging modality, digitized data may be acquired and processed for a substantial number of images in a single examination, each image representing a large data set defining discrete picture elements (pixels) of a reconstructed image, or volume elements (voxels) in three dimensional data sets. Computed tomography (CT) imaging systems, for example, can produce numerous separate images along an anatomy of interest in a very short examination timeframe. Other imaging modalities are similarly capable of producing large volumes of useful image data, including magnetic resonance imaging (MRI) systems, digital X-ray systems, X-ray tomosynthesis systems, ultrasound systems, positron emission tomography (PET) systems, and so forth. Ideally, all such images are stored centrally on the PACS, and made available to the radiologist for review and diagnosis.

A dynamic image data set can produce even greater amounts of image data. Dynamic imaging acquires a volume of data at multiple points in time to create a four-dimensional image. One purpose of dynamic imaging is to access the change over time of either a patient's anatomy or function. One example of an anatomical change might be a cardiac exam to measure ejection fraction. An example of a functional change is a perfusion study. The difference between the two is that functional examinations require holding the anatomy fixed, which may require non-rigid image registration to warp the anatomy into correspondence for each image at each moment in time. An example is dynamic contrast-enhanced magnetic resonance (MR) imaging, where the tissue's uptake of a contrast agent over time is studied.

Various techniques have been proposed and are currently in use for analyzing and compressing large data files, such as medical image data files. Image data files typically include streams of data descriptive of image characteristics, typically of intensities or other characteristics of individual pixels or voxels in the reconstructed image. In the medical diagnostic field, these image files are typically created during an image acquisition, encoding or processing (e.g., reconstruction) sequence, such as in an X-ray, MRI, CT, or other system, or in a processing station designed to process image data from such systems. The image data may be subsequently processed or reprocessed, such as to adjust dynamic ranges, or to enhance certain features shown in the image, for storage, transmittal and display.

While image files may be stored in raw and processed formats, many image files are quite large, and would occupy considerable disc or storage space. Moreover, an almost exponential increase in the resolutions of imaging systems has occurred and which appears will continue into the future, leading to the creation of ever larger image files, typically including more data as a result of the useful dynamic range of the imaging system, the size of the matrix of image pixels and voxels, and the number of images acquired per examination. In addition, the processing and memory requirements for current PACS systems for new clinical applications and techniques is beginning to tax current system capabilities, such as the ever increasing clinical needs for volumetric data sampled over time and for the use of multiple energy volumes for better visualization of anatomical and functional features.

In addition to occupying large segments of available memory, large image files can be difficult or time consuming to transmit from one location to another. In a typical medical imaging application, for example, a scanner or other imaging device will typically create raw data which may be at least partially processed at the scanner. The data is then transmitted to other image processing circuitry, typically including a programmed computer, where the image data is further processed and enhanced. Ultimately, the image data is stored either locally at the system, or in the PACS for later retrieval and analysis. In all of these data transmission steps, the large image data file must be accessed and transmitted from one device to another.

Current image handling techniques include compression of image data within the PACS environment to reduce the storage requirements and transmission times. Such compression techniques generally, however, compress entire files, including descriptive header information which could be useful in accessing or correlating images for review. Moreover, current techniques may not offer sufficiently rapid compression and decompression of image files to satisfy increasing demands on system throughput rates and access times. Finally, alternative compression and decompression techniques do not offer the desired compression ratios, in combination with rapid compression and decompression in a client-server environment.

Another drawback of existing compression techniques is that only certain portions of a medical image may be relevant for diagnosis or treatment. Thus, considerable storage space in a PACS may be allocated to the storage of medical image data that is irrelevant for the patient's diagnosis and treatment. This problem becomes even more acute as imaging systems achieve greater and greater resolutions, which correspond to a need for even more data storage space.

There is a need, therefore, for an improved image data compression and decompression technique which provides rapid compression and decompression of image files, such as dynamic image files, and which obtains improved compression ratios and transmission times. Furthermore, there is a particular need for a technique to enable image data storage systems to accommodate the increase in data required to store medical images obtained with ever increasing resolutions of imaging systems.

BRIEF DESCRIPTION

A technique is presented for selecting portions of a dynamic medical image data set to be stored and portions of the medical image data set to be discarded or processed differently in order to reduce the overall amount of image data that is stored for each image data set. The dynamic image data first is segmented and registered. The segmentation and registration enables changes in intensity based on patient motion to be distinguished from changes in intensity due to anatomical function. In general, the regions with changes in intensity due to anatomical function are more relevant than regions with changes in intensity due to patient motion. The regions of greatest relevance are stored at their full resolution. Regions of lesser relevance are stored at less than the full resolution. Finally, regions of no relevance may be discarded and not stored at all.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
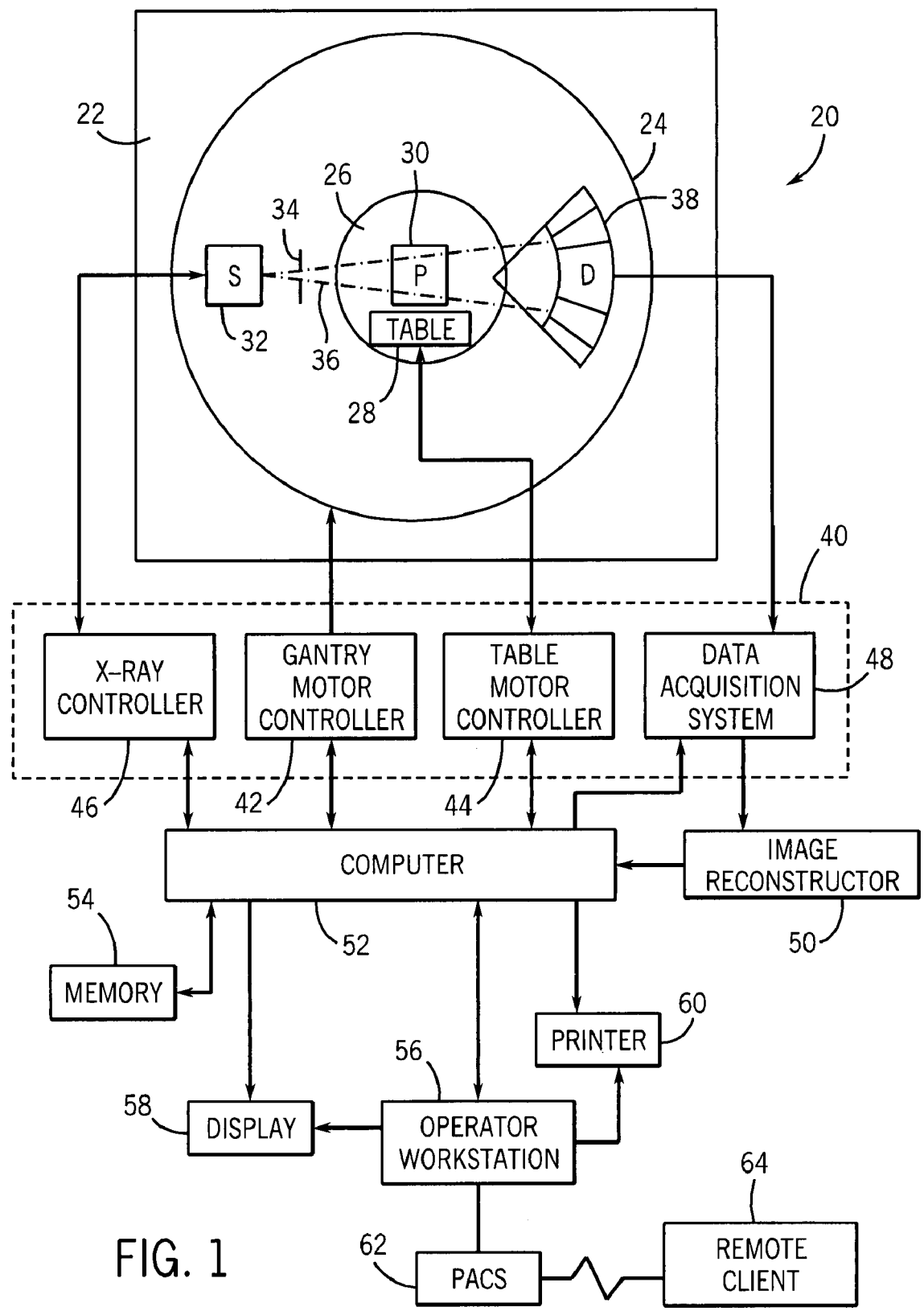
FIG. 1 is a schematic view of an exemplary imaging system, in this case a computed tomography ("CT") imaging system, designed to implement the enhanced image data storage scheme in accordance with an exemplary embodiment of the present technique.

Referring now to FIG. 1, the present invention will be described as it might be applied in conjunction with an exemplary imaging system, in this case a computed tomography (CT) imaging system. In general, however, it should be borne in mind that the present techniques may be used with image data produced by any suitable imaging modality. In a typical application, the imaging system may be designed both to acquire original image data and to process the image data for display and analysis is presented. As noted below, however, in certain applications the image data acquisition and subsequent processing (e.g, for the transformations and compression described below) may be carried out in physically separate systems or work stations. The illustrated embodiment of the CT imaging system 20 has a frame 22, a gantry 24, and an aperture (imaging volume or CT bore volume) 26. A patient table 28 is positioned in the aperture 26 of the frame 22 and the gantry 24. The patient table 28 is adapted so that a patient 30 may recline comfortably during the examination process.

The illustrated embodiment of the CT imaging system 20 has an X-ray source 32 positioned adjacent to a collimator 34 that defines the size and shape of the X-ray beam 36 that emerges from the X-ray source 32. In typical operation, the X-ray source 32 projects a stream of radiation (an X-ray beam) 36 towards a detector array 38 mounted on the opposite side of the gantry 24. All or part of the X-ray beam 36 passes through a subject, such as a patient 30, prior to impacting the detector array 38. It should be noted that all or part of the X-ray beam 36 may traverse a particular region of the patient 30, such as the liver, pancreas, heart, and so on, to allow a scan of the region to be acquired. The detector array 38 may be a single slice detector or a multi-slice detector and is generally formed by a plurality of detector elements. Each detector element produces an electrical signal that represents the intensity of the incident X-ray beam 36 at the detector element when the X-ray beam 36 strikes the detector array 38. These signals are acquired and processed to reconstruct an image of the features within the patient 30.

The gantry 24 may be rotated around the patient 30 so that a plurality of radiographic views may be collected along an imaging trajectory described by the motion of the X-ray source 32 relative to the patient 30. In particular, as the X-ray source 32 and the detector array 38 rotate along with the gantry 24, the detector array 38 collects photons resulting from X-ray beam attenuation at the various view angles relative to the patient 30 and produces signals or data representative of the incident photons. Data collected from the detector array 38 then undergoes pre-processing and filtering to condition the data to represent the line integrals of the attenuation coefficients of the scanned patient 30. The processed data, commonly called projections, are then filtered and back projected to formulate an image of the scanned area. Thus, an image or slice is acquired which may incorporate, in certain modes, less or more than 360 degrees of projection data, to formulate an image.

Rotation of the gantry 24 and operation of the X-ray source 32 are controlled by a system controller 40, which furnishes both power and control signals for CT examination sequences. Moreover, the detector array 38 is coupled to the system controller 40, which commands acquisition of the signals generated in the detector array 38. The system controller 40 may also execute various signal processing and filtration functions, such as for initial adjustment of dynamic ranges, interleaving of digital image data, and so forth. In general, system controller 40 commands operation of the imaging system 20 to execute examination protocols and to process acquired data. In the present context, system controller 40 also includes signal processing circuitry, typically based upon a general purpose or application-specific digital computer, associated memory circuitry for storing programs and routines executed by the computer, as well as configuration parameters and image data, interface circuits, and so forth. The system controller 40 includes a gantry motor controller 42 that controls the rotational speed and position of the gantry 24 and a table motor controller 44 that controls the linear displacement of the patient table 28 within the aperture 26. In this manner, the gantry motor controller 42 rotates the gantry 24, thereby rotating the X-ray source 32, collimator 34 and the detector array 38 one or multiple turns around the patient 30. Similarly, the table motor controller 44 displaces the patient table 28, and thus the patient 30, linearly within the aperture 26. Additionally, the X-ray source 32 may be controlled by an X-ray controller 46 disposed within the system controller 40. Particularly, the X-ray controller 46 may be configured to provide power and timing signals to the X-ray source 32.

In the illustrated embodiment, the system controller 40 also includes a data acquisition system 48. In this exemplary embodiment, the detector array 38 is coupled to the system controller 40, and more particularly to the data acquisition system 48. The data acquisition system 48 typically receives sampled analog signals from the detector array 38 and converts the data to digital signals for subsequent processing. An image reconstructor 50 coupled to the computer 52 may receive sampled and digitized data from the data acquisition system 48 and performs high-speed image reconstruction. Alternatively, reconstruction of the image may be done by the computer 52. Once reconstructed, the image produced by the imaging system 10 reveals internal features of the patient 30.

The data collected by the data acquisition system 48, or the reconstructed images, may be transmitted to the computer 52 and to a memory 54. It should be understood that any type of memory to store a large amount of data may be utilized by such an exemplary imaging system 10. Also the computer 52 may be configured to receive commands and scanning parameters from an operator via an operator workstation 56 typically equipped with a keyboard and other input devices. An operator may control the CT imaging system 20 via the operator workstation 56. Thus, the operator may observe the reconstructed image and other data relevant to the system from computer 52, initiate imaging, and so forth.

The CT imaging system 20 also has a display 58 that is coupled to the operator workstation 56 and the computer 52 and may be utilized by a user to observe the reconstructed image, as well as to provide an interface for control of the operation of the CT imaging system 20. In this embodiment, a printer 60 is present to enable a hard copy of a medical image to be printed. In the illustrated embodiment, the CT imaging system 20 is coupled to a picture archiving and communications system (PACS) 62 via the operator workstation 56 for long-term storage of image data. It should be noted that the PACS 62 may be coupled to a remote system 64, such as radiology department information system (RIS), hospital information system (HIS) or to an internal or external network, so that others at different locations may gain access to the image and to the image data. However, access to the image data may also be obtained remotely through the PACS 62.

It should be further noted that the computer 52 and operator workstation 56 may be coupled to other output devices, such as a standard or special purpose computer monitor and associated processing circuitry. One or more operator workstations 56 may be further linked in the CT imaging system 20 for outputting system parameters, requesting examinations, viewing images, and so forth. In general, displays, printers, workstations, and similar devices supplied within the CT imaging system 20 may be local to the data acquisition components, or may be remote from these components, such as elsewhere within an institution or hospital, or in an entirely different location, linked to the imaging system CT via one or more configurable networks, such as the Internet, virtual private networks, and so forth.

As noted above, it should be borne in mind that the CT system referred to herein is merely one exemplary source of image data that may be handled in accordance with the present techniques. Most such systems will include operator interfaces and software specifically adapted to acquire image data and to at least partially process the data in accordance with the specific physics of the imaging modality. Indeed, other arrangements of CT systems, other reconstruction techniques, and so forth may give rise to image data that may be managed as described herein.

Figure 2:
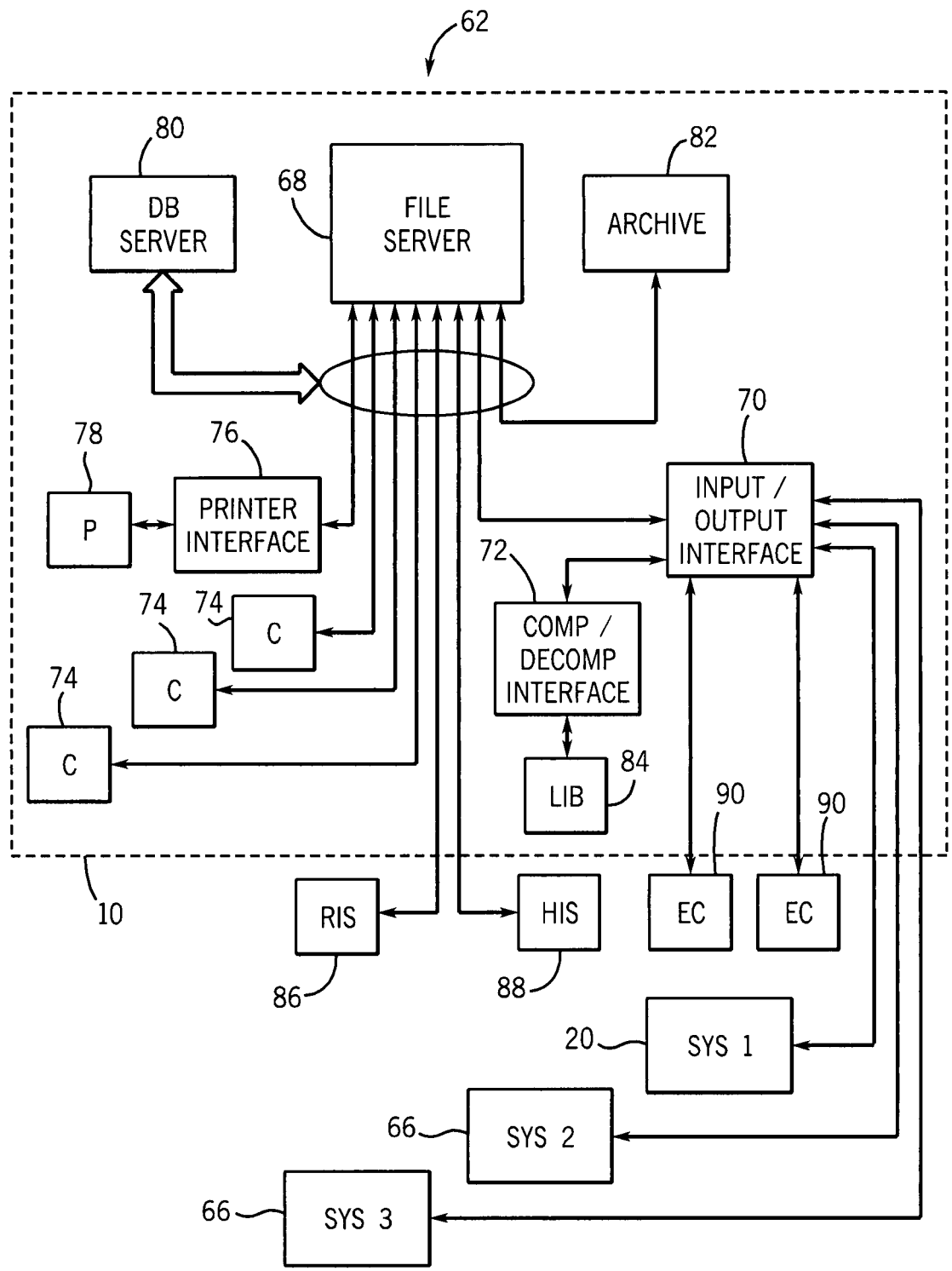
FIG. 2 is a diagrammatical representation of a picture archiving and communication system, or PACS, for receiving and storing image data from the imaging system of FIG. 1, in accordance with an exemplary embodiment of the present technique.

Referring generally to FIG. 2, an exemplary embodiment of a PACS 62 for receiving, compressing and decompressing image data is presented. In the illustrated embodiment, the CT imaging system 20 is used for short-term storage of image data only. Memory 54 of the CT imaging system 20 is limited and cannot be used to store image data with any degree of permanence, particularly when the system is used to carry out examinations for a large number of patients in a clinic, hospital or other institution. For example, data space occupied by old image data may be written over by new image data. The PACS 62 is used for long-term storage of medical image data. In the illustrated embodiment, PACS 62 receives image data from CT imaging system 20, as well as several other separate imaging systems designated by reference numeral 66. As will be appreciated by those skilled in the art, the imaging systems may be of various type and modality, such as MRI systems, PET systems, radio fluoroscopy (RF), computed radiography (CR), ultrasound systems, digital X-ray systems, X-ray tomosynthesis systems, ultrasound systems, and so forth. Moreover, the systems may include processing stations or digitizing stations, such as equipment designed to provide digitized image data based upon existing film or hard copy images. It should also be noted that the systems supplying the image data to the PACS may be located locally with respect to the PACS, such as in the same institution or facility, or may be entirely remote from the PACS, such as in an outlying clinic or affiliated institution. In the latter case, the image data may be transmitted via any suitable network link, including open networks, proprietary networks, virtual private networks, and so forth.

PACS 62 includes one or more file servers 68 designed to receive and process image data, and to make the image data available for decompression and review. File server 68 receives the image data through an input/output interface 70. Image data may be compressed in routines accessed through a compression/decompression interface 72. As described more fully below, compression/decompression interface 72 serves to compress the incoming image data rapidly and optimally, while maintaining descriptive image data available for reference by file server 68 and other components of the PACS. Where desired, compression/decompression interface 72 may also serve to decompress image data accessed through the file server 68. The file server 68 is also coupled to internal clients, as indicated at reference numeral 74, each client typically including a work station at which a radiologist, physician, or clinician may access image data from the server, decompress the image data, and view or output the image data as desired. Clients 74 may also input information, such as dictation of a radiologist following review of examination sequences. Similarly, file server 68 may be coupled to one or more interfaces, such as a printer interface 76 designed to access and decompress image data, and to output hard copy images via a printer 78 or other peripheral.

A database server 80 is used to associate image data, and other work flow information within the PACS, by reference to one or more file servers 68. In the presently contemplated embodiment, database server 80 may include cross-referenced information regarding specific image sequences, referring or diagnosing physician information, patient information, background information, work list cross-references, and so forth. The information within database server 80 serves to facilitate storage and association of the image data files with one another, and to allow requesting clients to rapidly and accurately access image data files stored within the system. Similarly, file server 68 is coupled to one or more archives 82, such as an optical storage system, which serve as repositories of large volumes of image data for backup and archiving purposes. Techniques for transferring image data between file server 68, and any memory associated with file server 68 forming a short-term storage system, and archive 82, may follow any suitable data management scheme, such as to archive image data following review and dictation by a radiologist, or after a sufficient time has lapsed since the receipt or review of the image files.

In the illustrated embodiment, other components of the PACS system or institution may be integrated with the foregoing components to further enhance the system functionality. For example, a compression/decompression library 84 is coupled to compression/decompression interface 72 and serves to store compression routines, algorithms, look up tables, and so forth, for access by input/output interface 70 (or other system components) upon execution of compression and decompression routines (i.e. to store various routines, software versions, code tables, and so forth). In practice, compression/decompression interface 72 may be part of compression/decompression library 84. Library 84 may also be coupled to other components of the system, such as internal clients 74 or printer interface 76, serving similarly as a library or store for the compression and decompression routines and algorithms. Although illustrated as a separate component, it should be understood that compression/decompression library 84 may be included in any suitable server or memory device, including within file server 68. Moreover, code defining the compression and decompression processes described below may be loaded directly into compression/decompression interface 72 and/or compression/decompression library 84, or may be loaded or updated via network links, including wide area networks, open networks, and so forth.

Additional systems may be linked to the PACS, such as directly to server 80, or through interfaces such as input/output interface 70. In the embodiment illustrated in FIG. 2, a radiology department information system or RIS 86 is linked to file server 68 to facilitate exchanges of data, typically cross-referencing data within database server 80, and a central or departmental information system or database. Similarly, a hospital information system or HIS 88 may be coupled to database server 80 to similarly exchange database information, workflow information, and so forth. Where desired, such systems may be interfaced through data exchange software, or may be partially or fully integrated with the PACS system to provide access to data between the PACS database and radiology department or hospital databases, or to provide a single cross-referencing database. Similarly, external clients, as designated at reference numeral 90, may be interfaced with the PACS to enable images to be viewed at remote locations. Such external clients may employ decompression software, or may receive image files already decompressed by compression/decompression interface 72. Again, links to such external clients may be made through any suitable connection, such as wide area networks, virtual private networks, and so forth.

Figure 3:
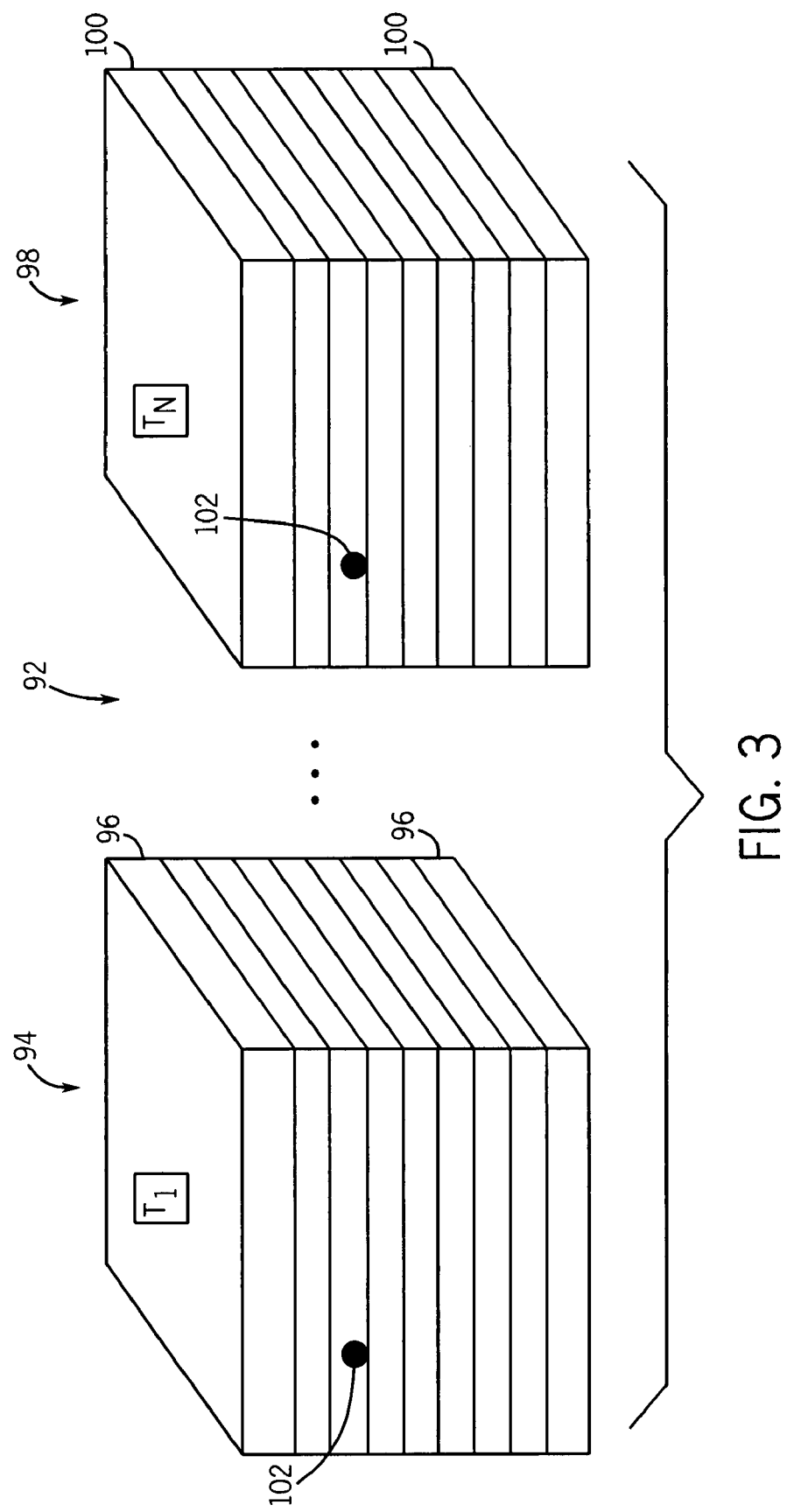
FIG. 3 is a representation of dynamic image data, in accordance with an exemplary embodiment of the present invention.

Referring generally to FIG. 3, a representation of dynamic image data is presented and represented generally by reference numeral 92. The dynamic image data 92 comprises a set of image data of a specific volume obtained at periodic intervals over a given time period. Thus, the image data set can be said to represent four-dimensional data, i.e., a three-dimensional volume over time, the fourth dimension. Additional dimension of data may be stored with the image data, as well. For example, temperature data, pulse data, respiration rate data, etc. can be stored with image data.

A first portion of the dynamic image data 92 is represented as a first stack 94 of image data slices 96 taken at a first time, $T_1$. A second stack 98 of image data slices 100 represents image data taken at a later time, $T_N$. The dynamic image data 92 includes the image data obtained at $T_1$ as well as the image data obtained at $T_N$ and any image data obtained at any point in between. The slices of image data are composed of voxels. In the illustrated embodiment, a representative voxel 102 is indicated as a dot. In the case of radiographic imaging, the voxel 102 contains data representative of the intensity of radiation in that volume at that specific time. The intensity of the voxel 102 at $T_1$ may vary over time, such that it may be different at $T_1$ than it is at $T_N$, or at any time in between. Typically, all of the intensity values for all of the voxels in all of the image slices are saved in long-term data storage. This can result in very large requirements for data storage space. It should be borne in mind, here again, that radiographic imaging is only one example of the source of image data that may be treated in accordance the invention. For imaging technologies based upon other physical parameters, the intensity, color, brightness or another parameter or characteristic of each pixel or voxel will be based the unique physics of that technology (e.g., net magnetic moment for MRI systems, gamma radiation received for PET imagines systems, and so forth).

Figure 4:
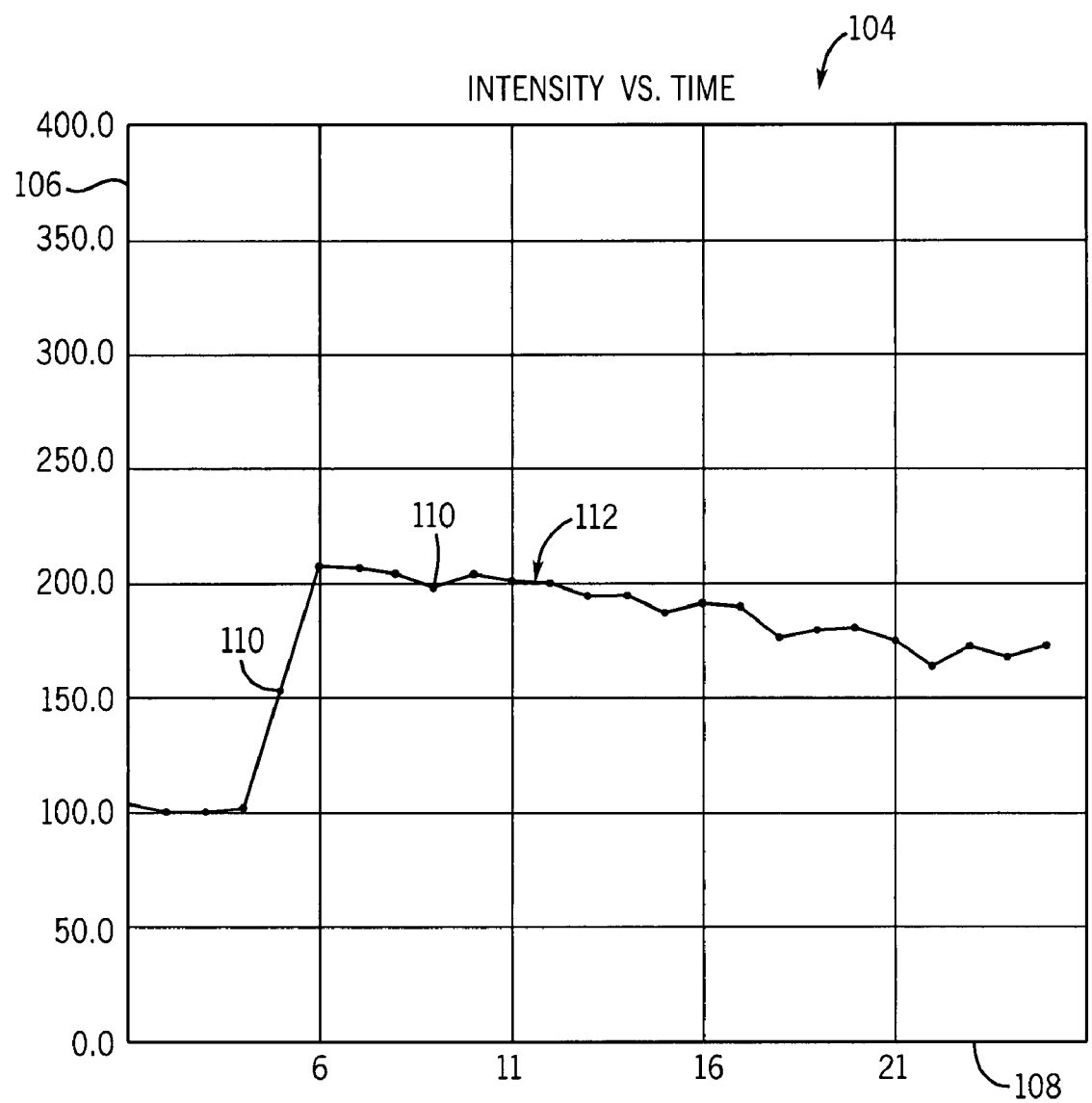
FIG. 4 is a graphical representation of intensity versus time for a pixel in the dynamic image data of FIG. 3, in accordance with an exemplary embodiment of the present invention.

Referring generally to FIG. 4, a chart illustrative of a change in the intensity within a voxel of image data over time is presented, and represented generally by reference numeral 104. The Y-axis 106 of the chart 104 represents intensity and the X-axis 108 represents time. Values of intensity 110 for a voxel at specific points in time are plotted on the chart and connected by a line 112. Thus, the line 112 represents four-dimensional image data. In the illustrated embodiment, the chart represents a scan taken with the addition of a contrast agent. A contrast agent may be given to the patient during or before the scan to obtain a contrast-enhanced image. The contrast agent generally affects the intensity or brightness of certain features or tissues viewable in the image. The changes in intensity over time can be used to classify tissues. For example, contrast uptake curves that are relatively flat correspond to healthy tissue. An undulating contrast uptake curve corresponds to moving tissue. Contrast uptake curves having a rapid rise and a gradual decline may correspond, for example, to tumor tissue. The illustrated chart has a rapid rise and then a gradual decline. Therefore, the tissue corresponding to the chart 104 corresponds to tumor tissue.

Figure 5:
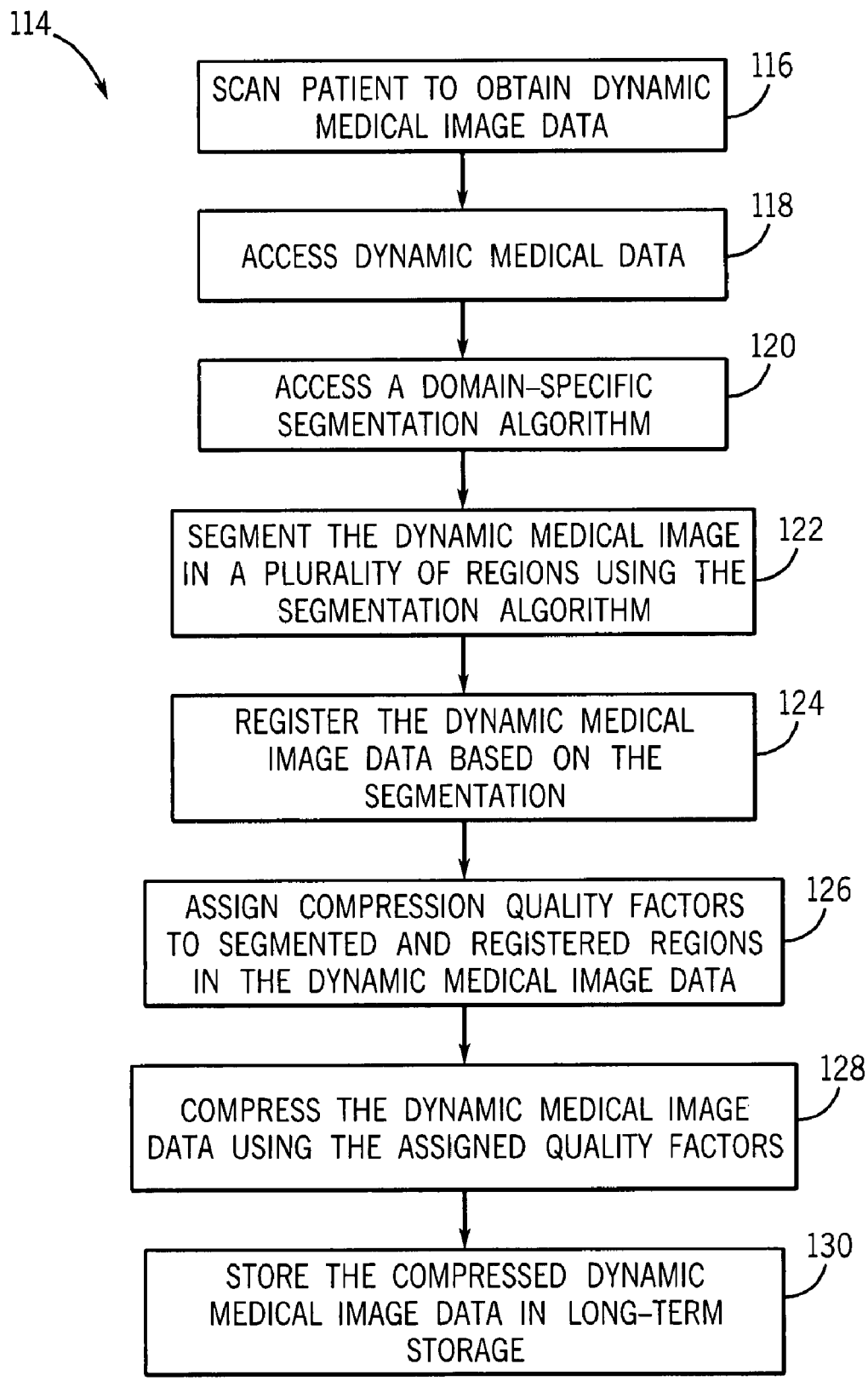
FIG. 5 is a block diagram of an exemplary method of storing dynamic image data, in accordance with an exemplary embodiment of the present invention.

Referring generally to FIG. 5, a first technique is presented for storing dynamic image data, represented generally by reference numeral 114. The technique enables the amount of image data that is stored in the PACS 62 for each dynamic image data set to be reduced. Depending upon their importance based on the purpose for obtaining the digital image data, each region of the image data can be compressed losslessly, compressed lossily, or discarded. More important regions would be compressed losslessly. Less important regions would be compress lossily. Finally, regions of no interest would be discarded. Therefore, by not storing all of the dynamic image data with lossless compression, the total amount of data storage needed for the dynamic image data set is reduced.

Initially, the patient is scanned via the imaging system (e.g., CT system 20 described above, or any other modality system, such as an MRI system) to obtain dynamic medical image data, represented generally by block 116. Images slices are obtained at periodic intervals over a time interval to obtain the dynamic medical image data. Typically, the medical image data that is acquired is obtained at a single resolution, ideally the highest, or greatest, resolution available from the imaging system.

The dynamic medical image data obtained by the imaging system is accessed by the PACS 62, represented generally by block 118. In practice, some filtering, processing and the like may be performed on the image data prior to forwarding it to the PACS. Moreover, as noted above, the processing described below may be performed by the PACS itself, or by an upstream component prior to storage of the image data in the PACS. Similarly, the data stored in the PACS may be processed as described below, to reduce memory needs, and then restored to the PACS. The full resolution dynamic medical image data is typically sent to the PACS 62 from the imaging system, such as CT imaging system 20. In this embodiment, the CT imaging system 20 is not used for long-term storage of medical image data. Long-term storage of medical image data occurs in the PACS 62. However, in other embodiments of the present technique, an imaging system may be used for long-term storage of dynamic medical image data.

The PACS 62 (or more generally, the component carrying out the segmentation process) accesses a domain-specific segmentation algorithm that is operable to segment regions of interest in the medical image data from regions of lesser interest, as represented by block 120. As will be appreciated by those skilled in the art, a large number of such segmentation algorithms are available for various anatomies, conditions, and so forth. The segmentation algorithm will typically be adapted to the anatomy or type of tissue, and specific algorithms may differ, depending upon the modality originating the image data. In practice, the particular segmentation algorithm selected and applied may be the result of operator intervention (e.g., interaction of a human operator at a workstation coupled to the PACS). Alternatively the segmentation algorithm selection and execution process may be partially or fully automated. Moreover, some algorithms may require or benefit from selections, settings, and options that may be made by a human operator, particularly considering the purpose for which the images were acquired (e.g., the anatomical features or conditions desired to be evaluated by a radiologist or other physician).

The domain-specific segmentation algorithm is then used to segment the dynamic image data into a plurality of regions based on spatio-temporal considerations, represented generally by block 122. The segmentation algorithm is used to establish whether changes in intensity over time are due to patient motion, anatomical motion, or contrast uptake. In addition, the segmentation algorithm can distinguish healthy tissues from cancerous/tumorous tissue. Once identified, the segmentation algorithm labels the dynamic image data voxels or pixels.

The dynamic medical image data is then registered based on the segmentation of the medical image data, as represented generally by block 124. By first registering the dynamic image data, the data compression that will follow is more efficient because frame-to-frame changes have been reduced. In addition, the registration enables changes in intensity based on patient motion to be distinguished from changes in intensity due to function. The tissue labeling from the segmentation is used by a registration algorithm to warp the image data by discerning whether a voxel's or pixel's intensity value changed over time due to anatomical motion or functional activity. For example, during a breast MRI, voxel intensities change in the heart due to cardiac motion, along the breast boundary due to anatomical motion, and within a breast tumor due to contrast uptake within a lesion. The registration corrects for anatomical motion, but not functional activity. Therefore, the changes in intensity based on contrast uptake can be identified.

Compression quality factors are then assigned to the segmented and registered regions in the dynamic image data, represented generally by block 126. A mask is generated from the segmented image data based on the clinical purpose of the scan. The segmented image data is used to create a mask having groups based on their relevance to the clinical purpose for obtaining the image data. In this embodiment, the segmentation algorithm is operable to classify the segmented portions of the image data into three groups based on their relevance to the clinical purpose for obtaining the medical image data. The three groups are image data having highly relevant content, image data having less relevant content, and image data having no relevant content. For example, a segmentation algorithm for a mammogram may group breast tissue as highly relevant, the underlying muscle tissue as less relevant, and bone as irrelevant.

The mask is comprised of image blocks that are assigned quality factors that correspond to the three groups of image data. A different quality factor is assigned to each group of image data to distinguish them. For example, an image block in the mask that corresponds to highly relevant image data may be assigned with a quality factor of "two." Similarly, each portion of the mask that corresponds to less relevant image data may be assigned with a quality factor of "one" and an image block in the mask that corresponds to irrelevant image data may be assigned a quality factor of "zero." However, these numbers are arbitrary and may vary depending upon the system in which the technique is utilized. The mask may be stored along with the image data.

The dynamic medical image data is then compressed, or discarded, based on the assigned compression quality factors, represented generally by block 128. The quality factors of the image blocks of the mask are transferred to corresponding image blocks in the dynamic image data. In the example described above, all image blocks of the highly relevant image data are assigned a quality factor of "two", the image blocks of the less relevant image blocks are assigned a quality factor of "one", and the image blocks of the irrelevant image data are assigned a quality factor of "zero". Using the quality factors, the image blocks corresponding to the highly relevant image data are compressed losslessly. Image blocks corresponding to the less relevant image data are compressed with lossy compression. Finally, image blocks corresponding to the irrelevant image data are discarded and not compressed. In the illustrated embodiment, the PACS 62 compresses the image data. The PACS identifies the quality factor for each image block prior to data compression and then uses the appropriate algorithm or tool to compress the block of image data. The image data may also be decomposed into a plurality of resolution levels using wavelet transformation.

The compressed dynamic image data is then stored in long-term storage, represented generally by block 130. From there, the image data may be retrieved from long-term storage for viewing at any time. Because not all of the image data was stored with lossless compression, the amount of data storage space needed to store each image is reduced. However, because all of the highly relevant image data is saved with lossless data compression, there is no loss of image data or resolution in the highly relevant regions of the image. In addition, the less relevant image data is provided for clarity, but at a lower resolution that the highly relevant image data. The resolution of the less relevant image data may be set to a desired value.

Figure 6:
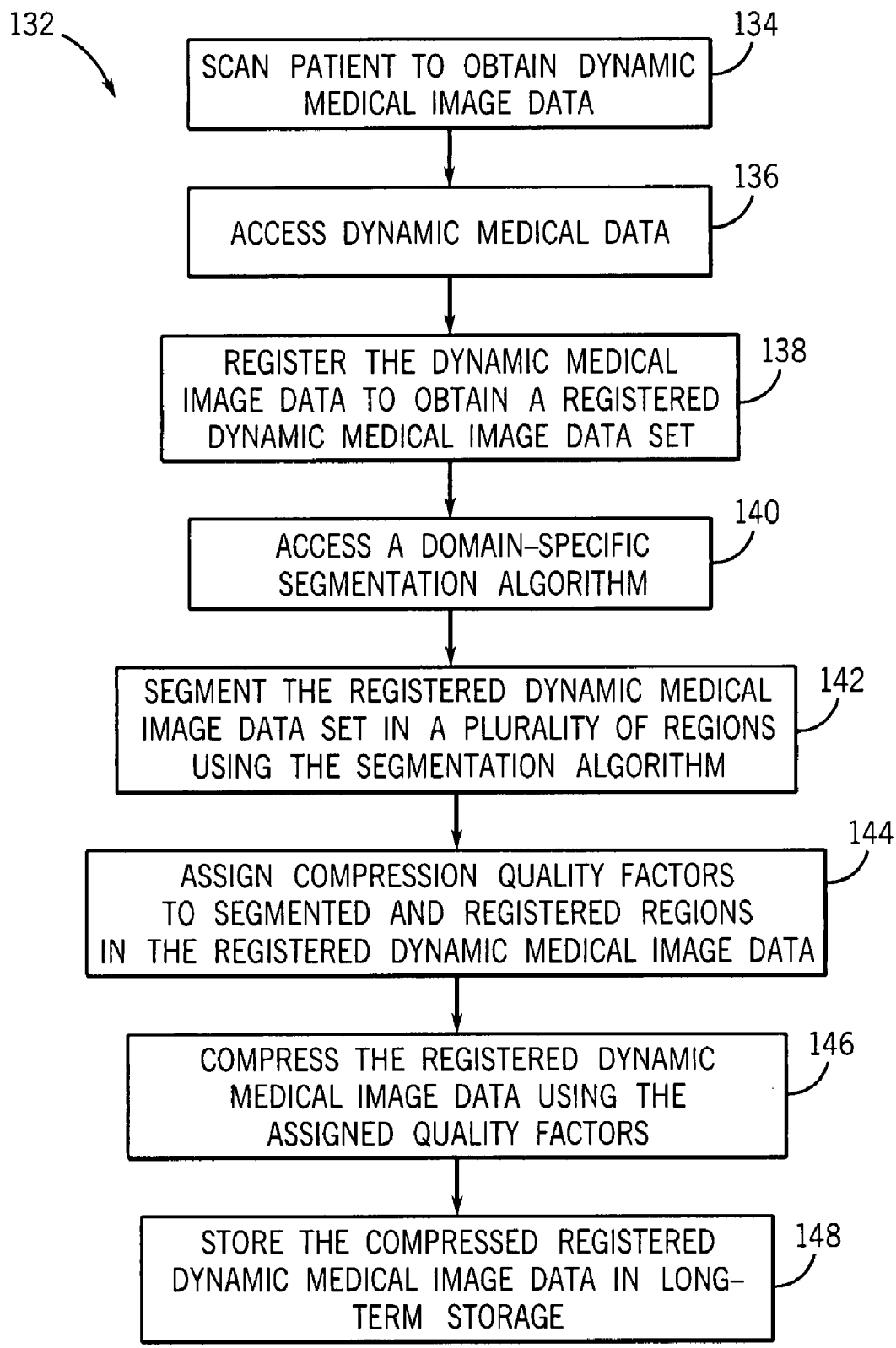
FIG. 6 is a block diagram of an alternative method of storing dynamic image data, in accordance with an exemplary embodiment of the present invention.

Referring generally to FIG. 6, a second technique is presented for storing dynamic image data, represented generally by reference numeral 132. This technique also enables the amount of image data that is stored in the PACS 62 for each dynamic image data set to be reduced. In addition, as with the first technique 114, each region of the image data can be compressed losslessly, compressed lossily, or discarded depending upon their importance. The second technique 132 differs from the first technique 114 primarily in the sequence of events. As with the first technique, the patient is scanned via an imaging system, represented generally by block 134. The full resolution medical image data is then accessed by the PACS 62, represented generally by block 136.

The second technique 132 differs from the first technique 114 in that the dynamic medical image data is registered to obtain a registered dynamic medical image data set, represented generally by reference numeral 138, before segmentation, as in the first technique 114. Next, a domain-specific segmentation algorithm is accessed, as represented by block 140. The segmentation algorithm is then used to segment the registered dynamic image data using the segmentation algorithm, represented generally by block 142. The PACS 62 may use a copy of the original image data for segmentation purposes. Compression quality factors are then assigned to the segmented and registered regions in the dynamic image data, represented generally by block 144. The dynamic medical image data is then compressed, or discarded, based on the assigned compression quality factors, represented generally by block 146. The compressed dynamic image data is then stored in long-term storage, represented generally by block 148.

Figure 7:
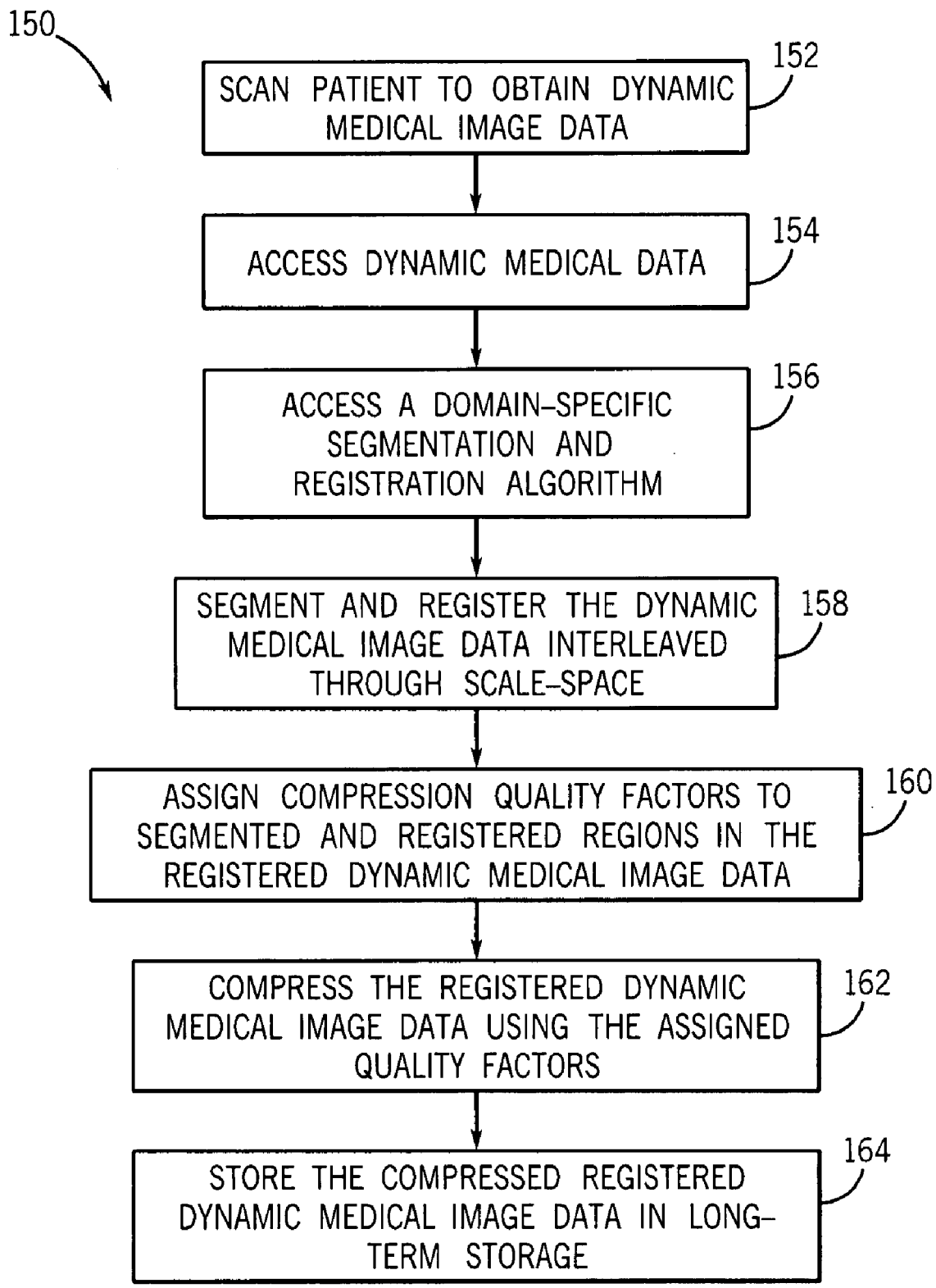
FIG. 7 is a block diagram of a second alternative method of storing dynamic image data, in accordance with an exemplary embodiment of the present invention.

Referring generally to FIG. 7, a third technique is presented for storing dynamic image data, represented generally by reference numeral 150. This technique also enables the amount of image data that is stored in the PACS 62 for each dynamic image data set to be reduced. In addition, as with the first technique 114 and the second technique 132, each region of the image data can be compressed losslessly, compressed lossily, or discarded depending upon their importance. The third technique 150 differs from the other techniques in that segmentation and registration of the dynamic image data occurs simultaneously. As with the first technique, the patient is scanned via an imaging system, represented generally by block 152. The full resolution medical image data is then accessed by the PACS 62, represented generally by block 154.

Rather than segmenting and registering the dynamic image data in a sequential manner, a domain-specific segmentation and registration algorithm is accessed that interleaves the segmentation and registration, as represented by block 156. The algorithm operates to recognize motion, which is then used to aid registration. Subsequent computations are then focused on regions of interest. The PACS 62 (or more generally, the component carrying out the segmentation and registration process) then segments and registers the dynamic medical image data, as represented by block 158. In addition, the algorithm labels the image data to enable the quality factors to be assigned.

As discussed above, compression quality factors are then assigned to the segmented and registered regions in the dynamic image data, represented generally by block 160. The dynamic medical image data is then compressed, or discarded, based on the assigned compression quality factors, represented generally by block 162. The compressed dynamic image data is then stored in long-term storage, represented generally by block 164.

Figure 8:
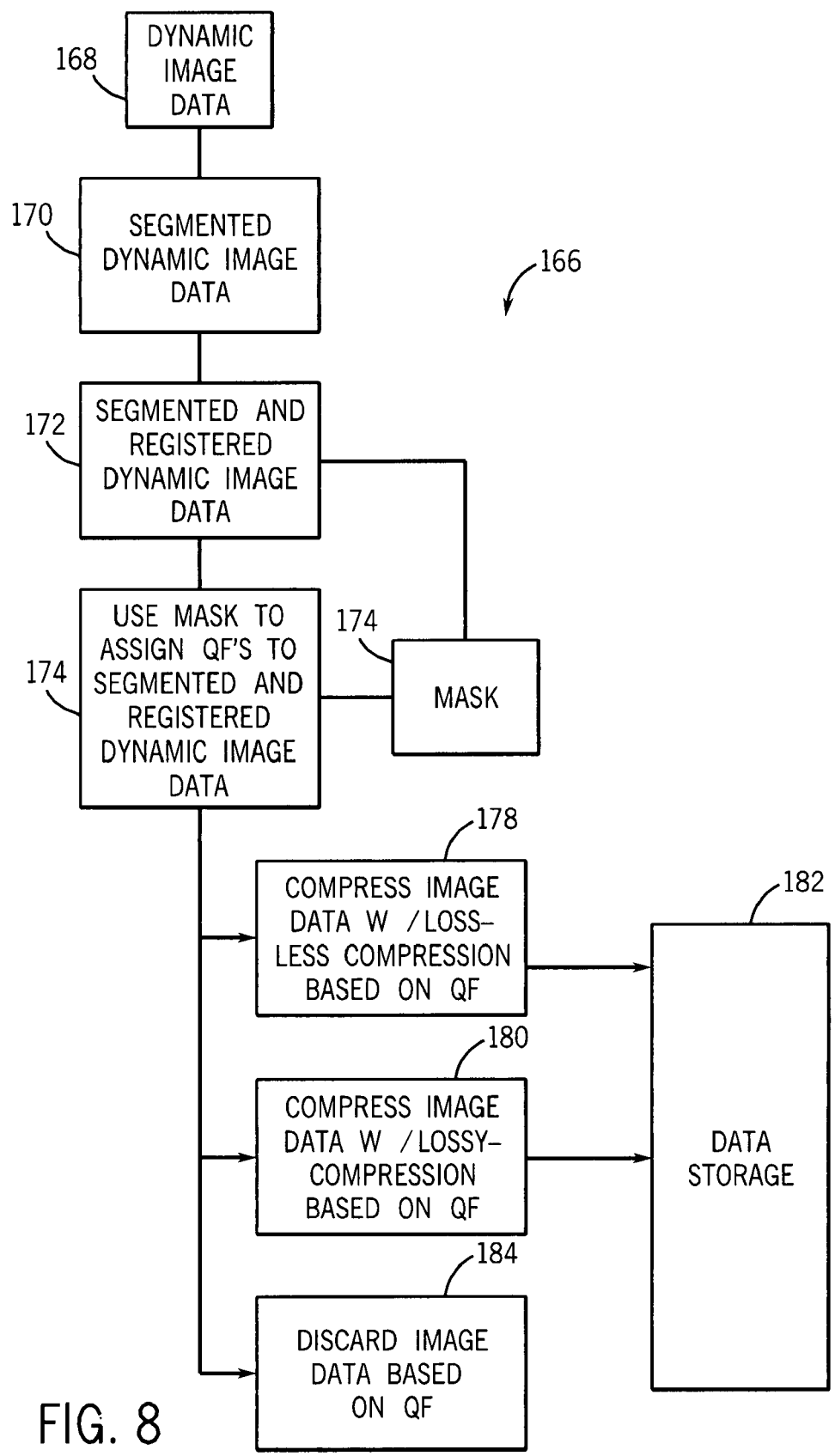
FIG. 8 is a diagrammatical representation of the technique of FIG. 3, in accordance with an exemplary embodiment of the present invention.

Referring generally to FIG. 8, a diagrammatical representation of a technique for selectively storing dynamic image data based on the content of the image is presented, referenced generally by reference numeral 166. Dynamic image data 168 is used to create a series of segmented images 170. The series of segmented images 170 is then registered to form segmented and registered dynamic image data 172. The segmented and registered dynamic image data 172 is used to create a mask 174. The mask 174 is then used to assign different compression quality factors to various regions of the segmented and registered dynamic image data 172, represented generally by block 176. In the illustrated embodiment, those portions of the image data having highly relevant status are compressed with lossless resolution, represented by block 178, while those portions having less relevant status are compressed with lossy compression at less than full resolution, as represented by block 180. The compressed data is then stored in long-term storage, as represented by block 182. Those portions of the image data having quality factors corresponding to irrelevant image data are discarded and not stored in long-term storage, represented by block 184. Thus, images that are stored in long-term storage will not have any image data for the discarded regions. As a result, images produced from the image data stored in long-term storage are composed of portions, or regions, having different resolutions. The most relevant portions of the image have full resolution, while images with less relevance have lower resolutions. In addition, the image may be decomposed using wavelet decomposition to produce different levels of image resolution. Each resolution level in such a multi-resolution image set would have a full resolution portion (for that resolution level) and a lower resolution portion (for that resolution level).

Figure 9:
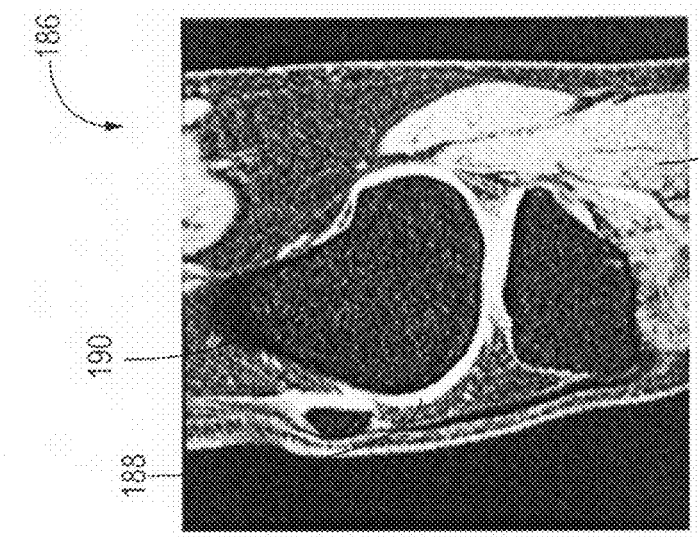
FIG. 9 is an exemplary medical image taken along the saggittal plane of the knee, in accordance with an exemplary embodiment of the present invention.

Referring generally to FIG. 9, a reconstructed image of an image slice of a patient's knee, referenced generally by reference numeral 186, is presented to illustrate the creation of a mask to assign compression quality factors to image data. In this image, the clinical purpose for obtaining the image data is to examine the condition of the femoral cartilage 188 within the knee 186. In addition to the femoral cartilage 188, various bones 190 of the knee 186, including portions of the femur and tibia, are shown. In addition, other soft tissues 192 are shown, such as muscles and ligaments.

Figure 10:
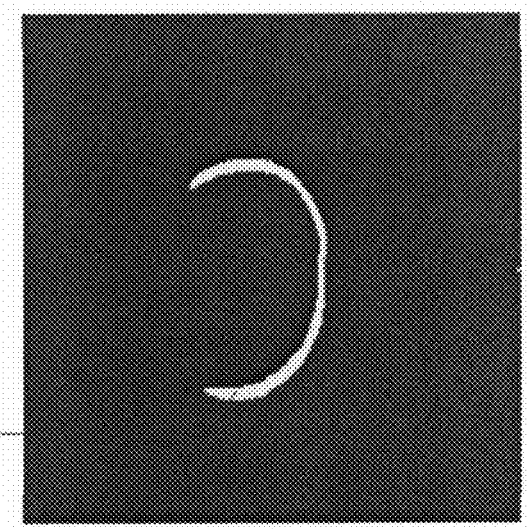
FIG. 10 is an exemplarly segmented image derived from the image of FIG. 9, in accordance with an exemplary embodiment of the present invention.

Referring generally to FIG. 10, a segmented image of the femoral cartilage 188 is presented. In addition, other tissues of the knee are segmented and used to form the mask.

Figure 11:
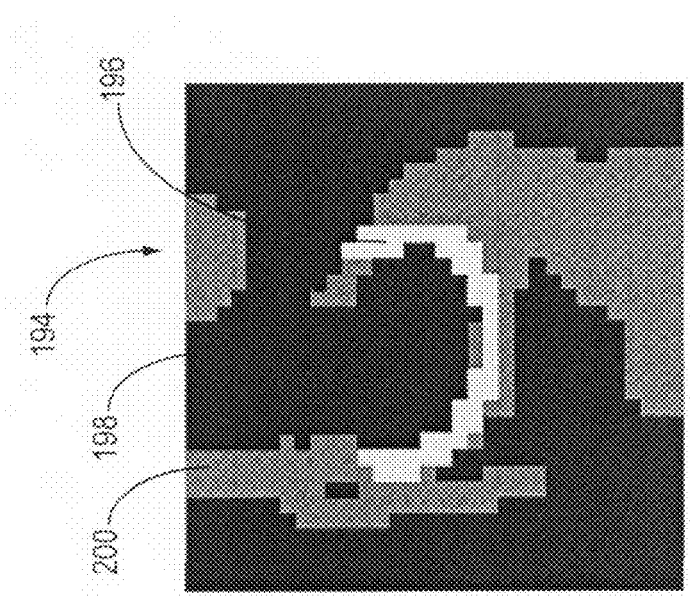
FIG. 11 is an image mask created from segmented image of FIG. 10, in accordance with an exemplary embodiment of the present invention.

Referring generally to FIG. 11, a mask, represented generally by reference numeral 194, of the knee of FIG. 9 is presented. In this embodiment, the mask 194 has three regions representing the three groups of tissues, each region having its own quality factors. The image blocks 196 corresponding to the femoral cartilage are assigned a quality factor to signify that these image blocks have the most relevance. In this particular embodiment, the image blocks 196 corresponding to the femoral cartilage are the most relevant and have an assigned quality factor of "two". The image blocks 198 corresponding to the bones of the knee are irrelevant and are assigned a quality factor of "zero" to signify that these image blocks are irrelevant. Finally, the image blocks 200 corresponding to the soft tissues of the knee are assigned a quality factor of "one" to signify that these image blocks are relevant, but less relevant than the femoral cartilage.

As discussed above, the mask 194 is used to assign quality factors to the knee 186 of FIG. 9 to direct the compression of the image data. In this embodiment, those portions of the image of the knee 186 that are assigned the quality factor having a value of "two" are compressed with lossless compression. In this example, that corresponds to the femoral cartilage and some of its adjacent tissue. Other portions of the knee 186 that are assigned quality factors having a value of "one" are compressed with lossy compression. In this example, that corresponds to the soft tissues 192 of the knee 186. As a result, the soft tissues have a lower resolution than the femoral cartilage 188 when viewed after the data has been compressed. Finally, the portions of the knee 186 that are assigned a quality factor of "zero" are simply discarded and not stored in long-term storage. In this example, that corresponds to bone. As a result, less data storage space is required to store the image than if all of the regions of the image had been stored at full resolution. However intended are presented in full resolution. In this example, that is the femoral cartilage and some adjacent tissue.

Figure 12:
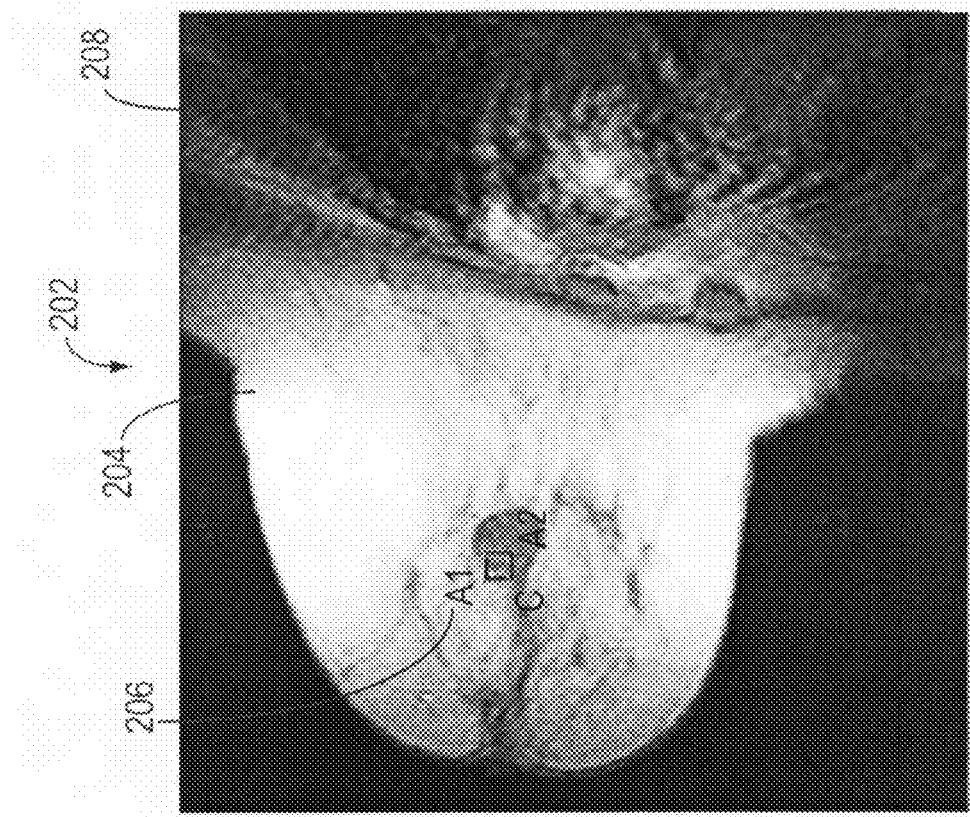
FIG. 12 is an exemplary medical image, in accordance with an exemplary embodiment of the present invention.

Referring generally to FIG. 12, a reconstructed image of a dynamic medical image of a breast is presented and represented generally by reference numeral 202. In the illustrated embodiment, the image of the breast was obtained with an MR imaging system. In the medical image 202, there are two types of breast tissue shown: healthy breast tissue 204 and unhealthy breast tissue 206. The healthy tissue is labeled "A1" and the unhealthy tissue is labeled "A2" on the image. In addition, other tissues 208 of the chest are shown.

The techniques described above may be used to reduce the amount of dynamic image data that is stored in long-term storage. For example, using the techniques described above, the unhealthy breast tissue 206 and the healthy breast tissue 204 may be stored using lossless data compression. Alternatively, the healthy breast tissue 204 may be stored with lossy data compression. The other tissues 208 of the chest may also be stored using a lossy data compression.

Figure 13:
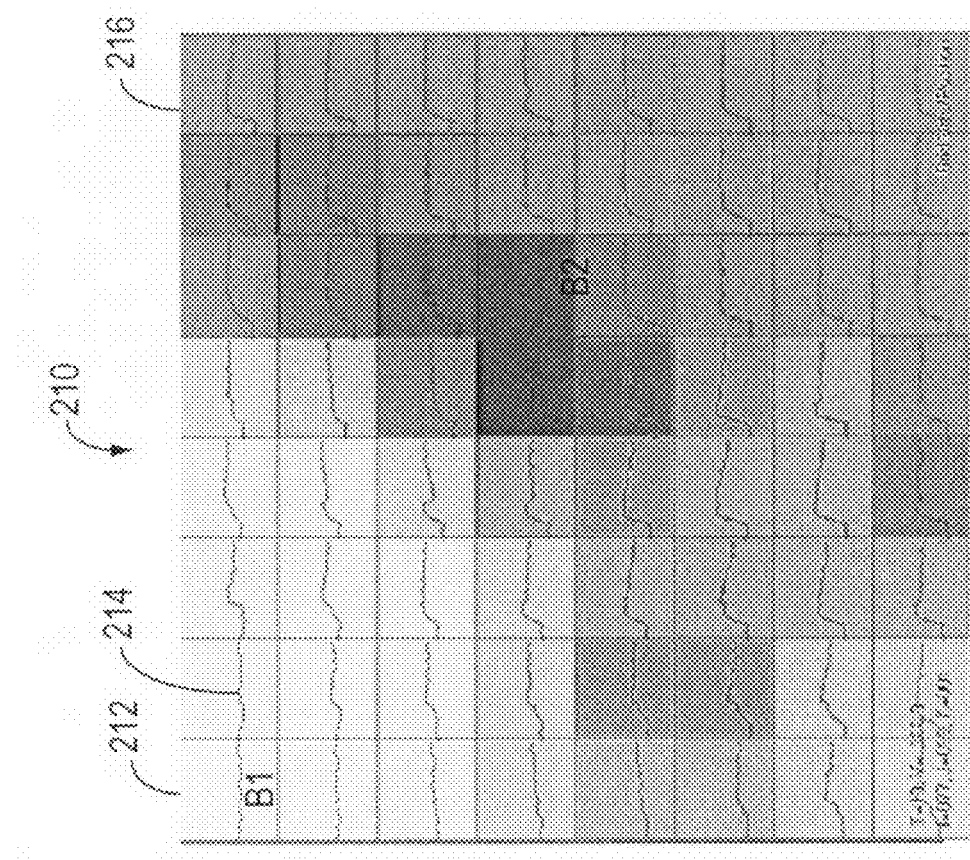
FIG. 13, is an exploded view of a parametric image accessible from FIG. 12, in accordance with an exemplary embodiment of the present invention.

Referring generally to FIG. 13, a parametric zoom image of region "C" of FIG. 12 is presented, and referenced generally by reference numeral 210. The zoom image may be accessed by a user using a mouse or similar interactive tool to activate a zoom function. In addition, any region of the image may be accessed in this manner. The parametric image is comprised of a series of charts 212 of intensity over time for individual voxels or pixels in region "C" of the dynamic image data. Each chart 212 has a contrast uptake curve 214 of image intensity over time for a specific voxel or pixel. As discussed above, a contrast uptake curve can be used to determine if tissue is healthy or unhealthy. As discussed above, contrast uptake curves of various tissue types conform to a known curve, or shape. This allows the tissue corresponding to each voxel to be classified by fitting its uptake curve to a set of characteristic models corresponding to tissue types. In FIG. 13, the contrast uptake curves 214 for the charts 212 within the region labeled "B1" are relatively flat. A relatively flat contrast uptake curve corresponds to healthy tissue. Therefore, these are healthy tissues. In the illustrated embodiment, these charts 212 are lightly shaded to reflect that they are healthy tissues. On the other hand, the contrast uptake curves 214 for the charts 216 within the region labeled "B2" have a rapid rise and a gradual decline. A contrast uptake curve 214 having a rapid rise and gradual decline corresponds to tumor tissue. Therefore, the tissues represented by these charts 216 are tumors and are shaded darkly to reflect that they are tumors. The contrast uptake curves 214 may be used to differentiate tissues during segmentation.

Figure 14:
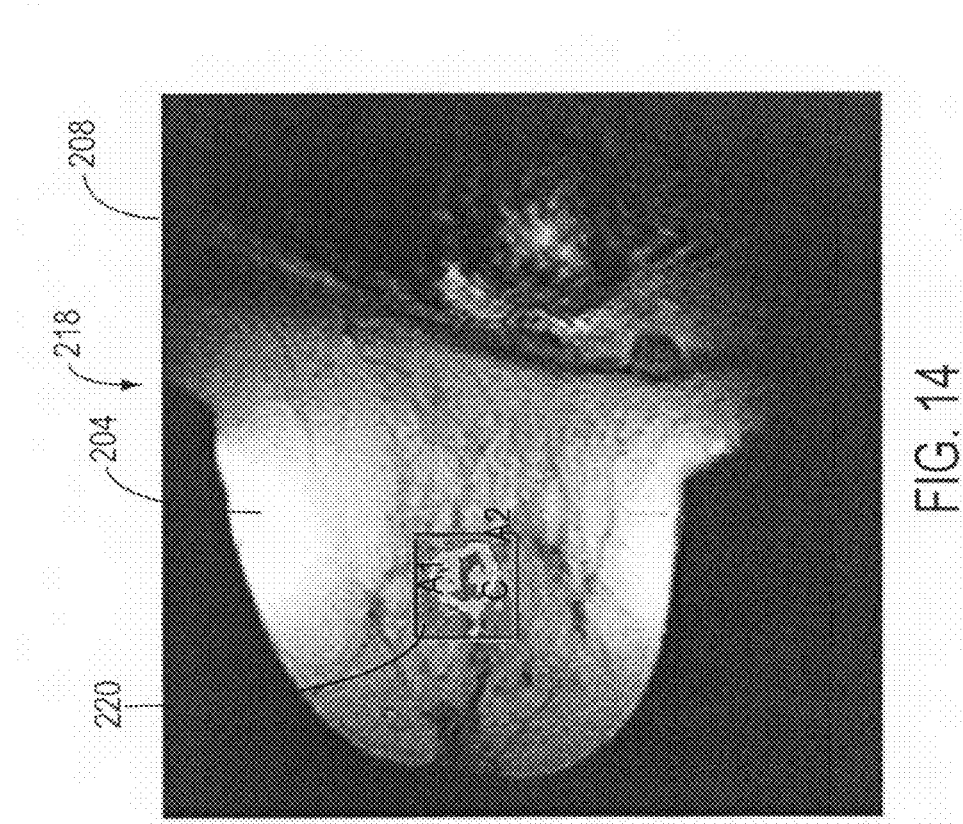
FIG. 14 is an exemplary parametric image overlaid over a medical image, in accordance with an exemplary embodiment of the present invention.

Referring generally to FIG. 14, a reconstructed image of an alternative embodiment of a dynamic medical image of a breast is presented and represented generally by reference numeral 218. In this embodiment, the parametric image, referenced generally by reference numeral 220, is overlaid onto the image of breast tissue 204.

Figure 15:
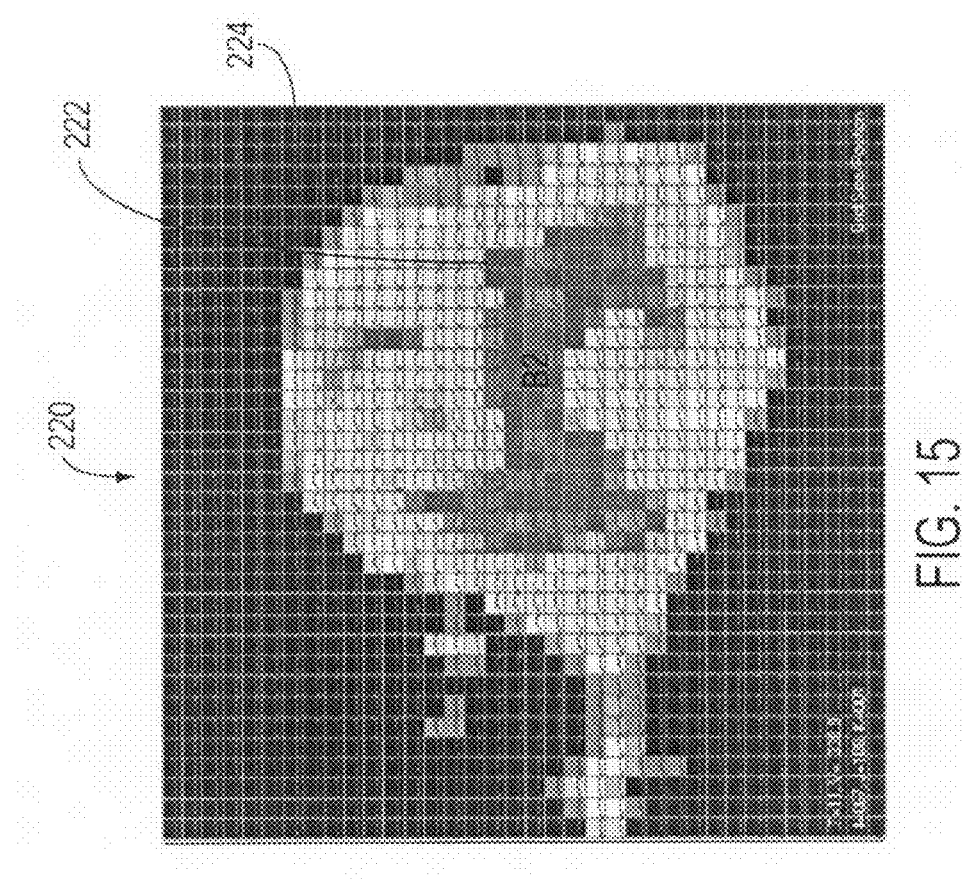
FIG. 15 is an exploded view of the temporal data of the parametric image of FIG. 14, in accordance with an exemplary embodiment of the present invention.

Referring generally to FIG. 15, a zoomed image of the parametric image 220 of FIG. 14 is presented. As with FIG. 13 above, the parametric image 220 is comprised of charts of contrast uptake curves corresponding to tissue in the breast. In addition, the charts 222 of tissue that is tumorous are shaded to reflect their tissue type, while the charts of 224 of healthy tissue are blackened.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computer-implemented method for processing image data, comprising a computer processor:
   accessing dynamic image data representative of an internal tissue of a subject of interest;
   registering the dynamic image data to distinguish intensity changes in the dynamic image data due to motion from intensity changes due to the internal tissue function and to correct the intensity changes due to motion but not function;
   segmenting the dynamic image data;
   assigning data compression information to the dynamic image data; and
   compressing the dynamic image data due to the data compression information.

2. The computer-implemented method for processing image data as recited in claim 1, wherein compressing the dynamic image data comprises compressing a first portion of the dynamic image data with lossless compression due to the data compression information.

3. The computer-implemented method for processing image data as recited in claim 2, wherein compressing the dynamic image data comprises compressing a second portion of the dynamic image data with lossy compression based on the data compression information.

4. The computer-implemented method for processing image data as recited in claim 3, wherein the first portion and second portion of dynamic image data are stored in long-term storage.

5. The computer-implemented method for processing image data as recited in claim 1, comprising:
   discarding a portion of the dynamic image data based on the data compression information.

6. The computer-implemented method for processing image data as recited in claim 1, wherein the dynamic image data comprises image data acquired at a plurality of points in time.

7. The computer-implemented method for processing image data as recited in claim 1, wherein segmenting the dynamic image data comprises selecting a segmentation algorithm from a plurality of segmentation algorithms based on the purpose for obtaining the dynamic image data.

8. The computer-implemented method for processing image data as recited in claim 1, wherein segmenting the dynamic image data comprises segmenting the dynamic image data based on changes in image intensity over time.

9. The computer-implemented method for processing image data as recited in claim 1, comprising:
creating a mask from segmented image data, wherein the mask comprises data compression information.

10. The computer-implemented method for processing image data as recited in claim 9, wherein creating the mask is based on a clinical purpose for obtaining the image data.

11. The computer-implemented method for processing image data as recited in claim 10, wherein creating the mask comprises selecting a purpose for obtaining the image data from among a plurality of purposes for obtaining the image data.

12. The computer-implemented method for processing image data as recited in claim 9, comprising:
storing the mask in long-term data storage.

13. The computer-implemented method for processing image data as recited in claim 9, wherein assigning data compression information to the dynamic image data comprises transferring data compression information from the mask to the dynamic image data.

14. A computer-implemented method for storing image data, comprising a computer processor:
accessing dynamic image data representative of an internal tissue of a subject of interest comprising image data representative of each of a plurality of images acquired over a time interval;
registering the image data representative of each of the plurality of images acquired over a time interval to distinguish intensity changes in the dynamic image data due to motion from intensity changes due to the internal tissue function and to correct the intensity changes due to motion but not function; and
compressing a first portion of the dynamic image data with lossless data compression and a second portion of the dynamic image data with lossy data compression.

15. The computer-implemented method for storing image data as recited in claim 14, comprising:
storing the first portion and second portion of the dynamic image data in long-term storage.

16. The computer-implemented method for storing image data as recited in claim 15, comprising:
discarding a third portion of the dynamic image data.

17. The computer-implemented method for storing image data as recited in claim 14, comprising:
segmenting the dynamic image data.

18. The computer-implemented method for storing image data as recited in claim 17, wherein segmenting the dynamic image data comprises selecting a segmentation algorithm from a plurality of segmentation algorithms based on the purpose for obtaining the dynamic image data.

19. The computer-implemented method for storing image data as recited in claim 15, wherein segmenting the dynamic image data comprises:
creating a mask labeled with dynamic image data compression information based on segmented dynamic image data; and
transferring the dynamic image data compression information from the mask to the dynamic image data.

20. The computer-implemented method for storing image data as recited in claim 19, wherein the dynamic image data compression information comprises a plurality of compression quality factors: a first compression quality factor corresponding to the region of most relevance, a second compression quality factor corresponding to the region of lesser relevance, and a third compression quality factor corresponding to the region of no relevance.

21. The computer-implemented method for storing image data as recited in claim 20, wherein the first compression quality factor corresponds to lossless data compression, the second compression quality factor corresponds to lossy data compression, and the third compression quality factor corresponds to discarding the image data.

22. A computer-implemented method for storing image data, comprising a computer processor:
accessing dynamic image data representative of an internal tissue of a subject of interest comprising image data representative of each of a plurality of images acquired over a time interval;
registering the image data representative of each of the plurality of images acquired over a time interval to distinguish intensity changes in the dynamic image data due to motion from intensity changes due to the internal tissue function and to correct the intensity changes due to motion but not function; and
compressing different portions of the dynamic image data with different data compression based on a purpose for obtaining the dynamic image data.

23. The computer-implemented method for storing image data as recited in claim 22, comprising:
segmenting the dynamic image data to produce segmented image data.

24. The computer-implemented method for storing image data as recited in claim 23, wherein segmenting the dynamic image data comprises selecting a segmentation algorithm from a plurality of segmentation algorithms based on the purpose for obtaining the dynamic image data.

25. The computer-implemented method for storing image data as recited in claim 22, wherein compressing different portions of the dynamic image data comprises compressing a first portion of the dynamic image data with lossless compression and a second portion of the dynamic image data with lossy data compression.

26. The computer-implemented method for storing image data as recited in claim 25, comprising:
discarding a third portion of the dynamic image data.

27. A system stored on a computer-readable medium for processing image data, comprising:
means for accessing dynamic image data representative of an internal tissue of a subject of interest;
means for registering the dynamic image data to distinguish intensity changes in the dynamic image data due to motion from intensity changes due to the internal tissue function and to correct the intensity changes due to motion but not function;
means for segmenting the dynamic image data;
means for assigning data compression information to the dynamic image data; and
means for compressing the dynamic image data based on the data compression information.

28. A system stored on a computer-readable medium for storing image data, comprising:
means for accessing dynamic image data representative of an internal tissue of a subject of interest comprising image data representative of each of a plurality of images acquired over a time interval;
means for registering the image data representative of each of the plurality of images acquired over a time interval to distinguish intensity changes in the dynamic image data due to motion from intensity changes due to the internal tissue function and to correct the intensity changes due to motion but not function; and means for compressing a first portion of the dynamic image data with lossless compression and a second portion of the dynamic image data with lossy compression based on the image data compression information.

29. A system stored on a computer-readable medium for storing image data, comprising:
  means for accessing dynamic image data representative of an internal tissue of a subject of interest comprising image data representative of each of a plurality of images acquired over a time interval;
  means for registering the image data representative of each of the plurality of images acquired over a time interval to distinguish intensity changes in the dynamic image data due to motion from intensity changes due to the internal tissue function and to correct the intensity changes due to motion but not function; and
  means for compressing different portions of the dynamic image data with different data compression based on a purpose for obtaining the dynamic image data.

30. A computer-readable medium for processing medical image data, comprising:
  code operable to access dynamic image data representative of an internal tissue of a subject of interest;
  code operable to register the dynamic image data to distinguish intensity changes in the dynamic image data due to motion from intensity changes due to the internal tissue function and to correct the intensity changes due to motion but not function;
  code operable to segment the dynamic image data;
  code operable to assign data compression information to the dynamic image data; and
  code operable to compress the dynamic image data based on the data compression information.

31. A computer-readable medium for processing medical image data, comprising:
  code operable to access dynamic image data representative of an internal tissue of a subject of interest comprising image data representative of each of a plurality of images acquired over a time interval;
  code operable to register the image data representative of each of the plurality of images acquired over a time interval to distinguish intensity changes in the dynamic image data due to motion from intensity changes due to the internal tissue function and to correct the intensity changes due to motion but not function; and
  code operable to compress a first portion of the dynamic image data with lossless compression and a second portion of the dynamic image data with lossy compression based on the image data compression information.

32. A computer-readable medium for processing medical image data, comprising:
  code operable to access dynamic image data representative of an internal tissue of a subject of interest comprising image data representative of each of a plurality of images acquired over a time interval;
  code operable to register the image data representative of each of the plurality of images acquired over a time interval to distinguish intensity changes in the dynamic image data due to motion from intensity changes due to the internal tissue function and to correct the intensity changes due to motion but not function; and
  code operable to compress different portions of the dynamic image data with different data compression based on a purpose for obtaining the dynamic image data.

* * * * *